(12) United States Patent
Liu

(10) Patent No.: US 8,520,373 B2
(45) Date of Patent: Aug. 27, 2013

(54) DISPLAY ASSEMBLY FOR A PORTABLE MODULE

(75) Inventor: Jin Liu, Mississauga (CA)

(73) Assignee: Psion Inc., Mississauga, Ontario (CA)

( * ) Notice: Subject to any disclaimer, the term of this patent is extended or adjusted under 35 U.S.C. 154(b) by 368 days.

(21) Appl. No.: 12/766,152

(22) Filed: Apr. 23, 2010

(65) Prior Publication Data

US 2011/0261510 A1    Oct. 27, 2011

(51) Int. Cl.
*H05K 5/00* (2006.01)
*H05K 7/00* (2006.01)
*G06F 1/16* (2006.01)

(52) U.S. Cl.
USPC ............ 361/679.03; 361/679.21; 361/679.22; 361/679.26

(58) Field of Classification Search
USPC ............. 361/679.03, 679.21, 679.22, 679.26; 455/575.1
See application file for complete search history.

(56) References Cited

U.S. PATENT DOCUMENTS

| | | | | |
|---|---|---|---|---|
| 5,479,285 A | * | 12/1995 | Burke | 349/58 |
| 7,876,288 B1 | * | 1/2011 | Huang | 345/4 |
| 8,023,261 B2 | * | 9/2011 | Sanford et al. | 361/679.55 |
| 2006/0209012 A1 | * | 9/2006 | Hagood | 345/109 |
| 2006/0227114 A1 | * | 10/2006 | Geaghan et al. | 345/173 |
| 2010/0025942 A1 | | 2/2010 | Mangaroo et al. | |
| 2011/0260829 A1 | * | 10/2011 | Lee | 340/5.51 |

* cited by examiner

*Primary Examiner* — Anthony Haughton

(57) ABSTRACT

A display assembly for a portable module is disclosed. The display assembly has a housing that includes a base portion and a continuous side portion extending from the base portion to define an interior compartment. The assembly further includes a resilient body positioned in the interior compartment of the housing, the resilient body having a base portion and a continuous side portion extending from the base portion to define an interior channel. A display is positioned in the interior channel of the resilient body and the display and the resilient body are then positioned in the interior compartment of the housing. A sealing gasket is positioned between the top surface of the display and the cover plate, the sealing gasket overlapping a portion of the surface of the display. When the cover plate is coupled to the housing, the sealing gasket creates a tight seal between the display and the sealing gasket to inhibit the penetration of foreign matter into the interior compartment of the housing and the expansion gap in the cover plate accommodates the expansion of the sealing gasket.

13 Claims, 9 Drawing Sheets

DISPLAY ASSEMBLY FOR A PORTABLE MODULE

FIELD OF INVENTION

The present invention relates to a display assembly, more specifically, this present invention relates to a display assembly for a portable module.

BACKGROUND OF THE INVENTION

Wireless communication has advanced significantly over the past few decades. Today, mobile terminals play an important role in consumer and commercial settings. As consumers and business operators utilize mobile terminals as an integral part of their lives and businesses, it is increasingly becoming important to be able to take these devices and access the functionalities provided by these devices where ever they go. As a result, today's mobile devices are frequently used in environments hostile to the mobile terminal's electronics. This is particularly true for business operators who may be using these wireless devices in warehouses or in outdoor environments where the devices may be exposed to undesirable foreign matter (e.g. water, other fluids, moisture, particulate matter, dust, etc.). Accordingly, the sealing feature of a display of the mobile device and the device housing is important for the continued operational integrity of the device in the presence of such hostile environments.

In Mangaroo et al. (US Patent Publication No. 2010/0025942), a resilient seal component for a portable terminal to inhibit the penetration of foreign matter from an exterior environment into the interior of the portable terminal is described. The resilient seal component is positioned between the display and the interior compartment of the portable terminal where the display resides. The resilient seal component has at least one sealing rib to prevent the penetration of foreign matter from the exterior environment into the interior of the portable terminal. Although an effective seal is created, the display is vulnerable to a phenomenon known as "pillowing". This effect occurs when the top film 302 (e.g. touchscreen layer) is distorted by lateral forces (e.g. 300B in FIG. 1) exerted from the top portion of the resilient seal component. As depicted in FIG. 1, the force 300A is translated into force 300B because the sealing body 304 can only move inwardly. When the inward force 300B is exerted onto the top film 302 of the display 306, the film 302 separates from the display and rises like a "pillow"—See FIG. 1. "Pillowing" effect leads to degradation of optical appearance, imprecise and inaccurate touch input detection, and can also lead to an electrical short between layers. Therefore, there is a need for a display assembly that reduces or eliminates this "pillowing" effect and that provides effective seal against unwanted foreign materials.

SUMMARY OF THE INVENTION

According to an aspect of the present invention there is provided a display assembly for a portable module. The display assembly includes: a housing comprising a base portion and a continuous side portion extending from the base portion to define an interior compartment; a resilient body positioned in the interior compartment of the housing, the resilient body comprising a base portion and a continuous side portion extending from the base portion to define an interior channel; a display positioned in the interior channel of the resilient body; a cover plate for enclosing the housing, the cover plate having an expansion gap; and, a sealing gasket positioned between a surface of the display and the cover plate, the sealing gasket overlapping a portion of the surface of the display. When the cover plate is coupled to the housing, the sealing gasket creates a tight seal between the display and the sealing gasket to inhibit the penetration of foreign matter into the interior compartment of the housing and the expansion gap in the cover plate accommodates the expansion of the sealing gasket.

BRIEF DESCRIPTION OF THE DRAWINGS

These and other features of the invention will become more apparent from the following description in which reference is made to the appended drawings wherein.

DETAILED DESCRIPTION

Portable Terminal

Figure 1:
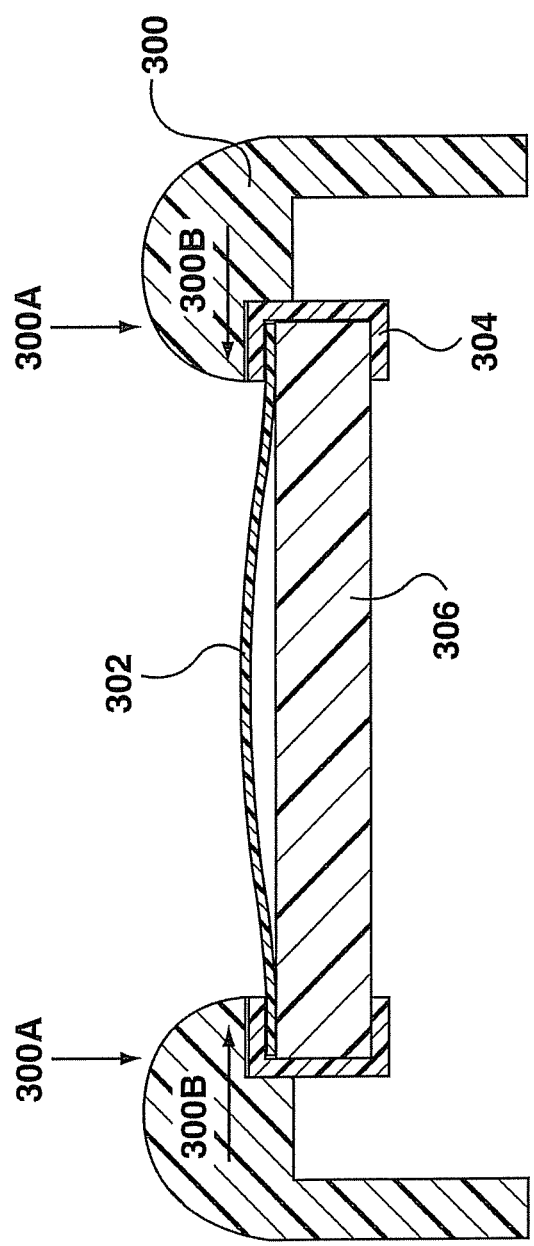
FIG. 1 shows a prior art display assembly showing the "pillowing" effect.
Figure 2:
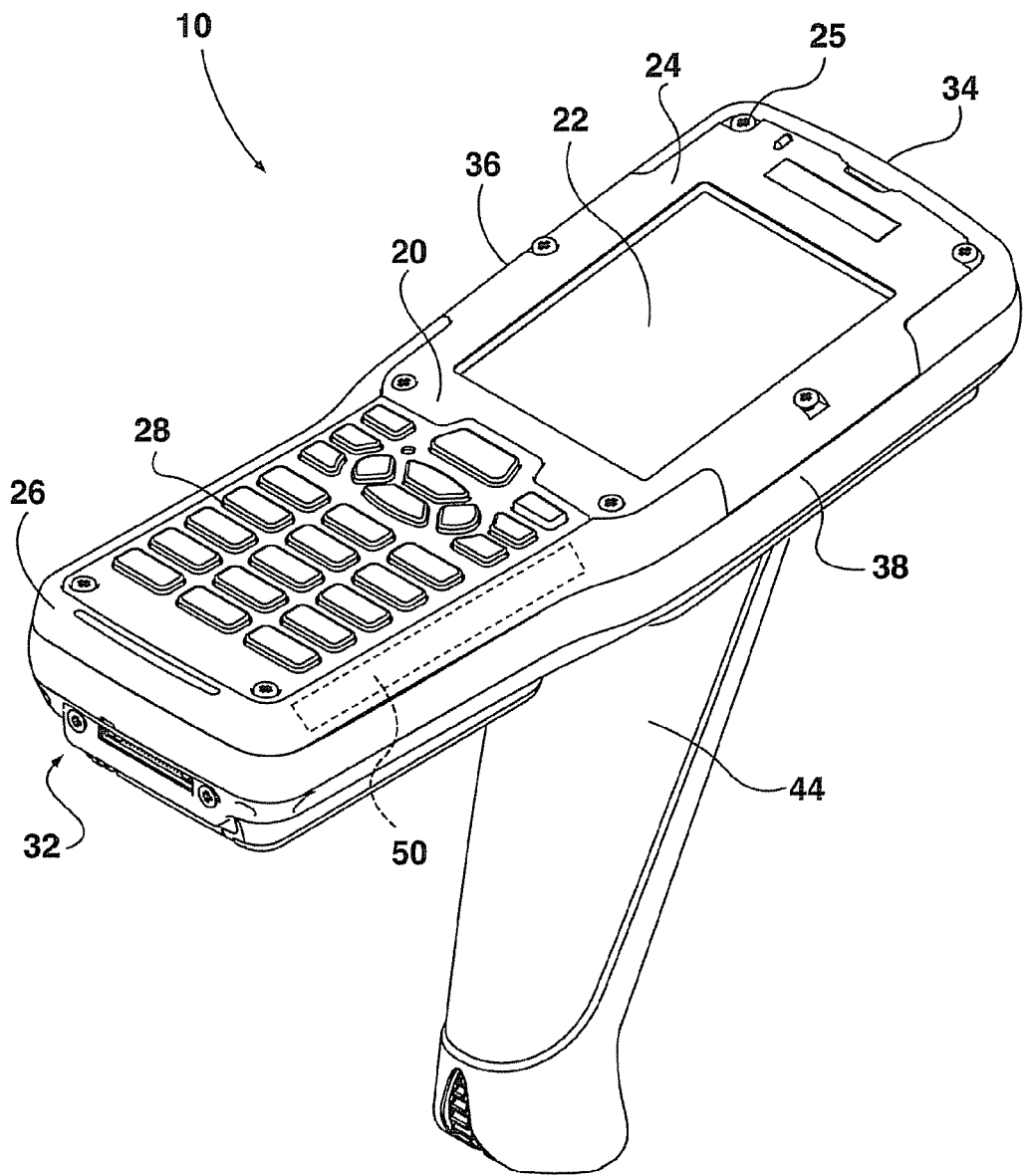
FIG. 2 shows a perspective top view of a portable module according to an embodiment of the present invention.
Figure 3:
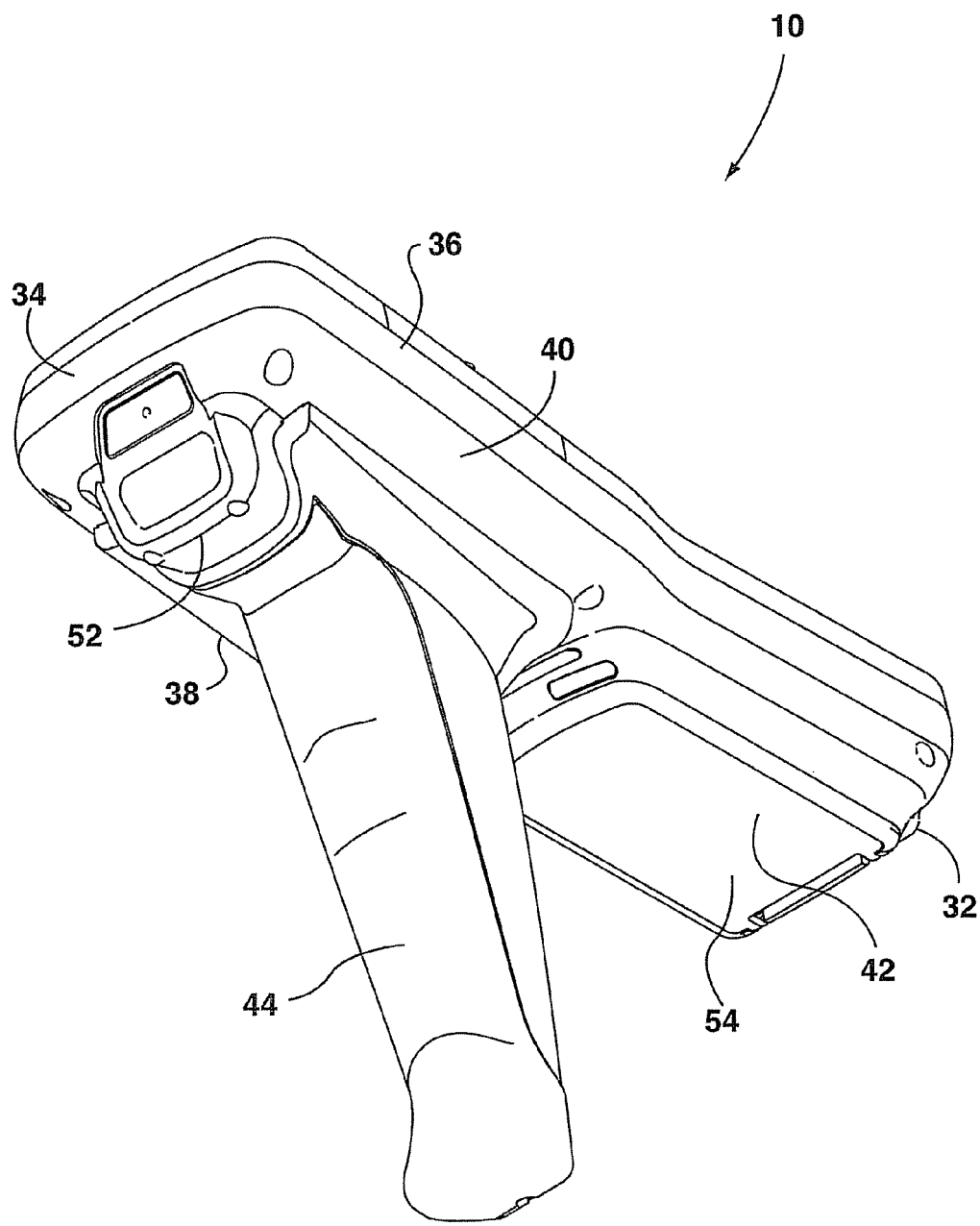
FIG. 3 shows a perspective bottom view of a portable module of FIG. 2.

Referring to FIGS. 2 and 3, shown is a portable terminal 10 with wireless communication capabilities. The portable terminal 10 may be used, for example, in industrial, retail or supply chain environments to track objects such as barcode labels or RFID tags. However, it is recognized that the portable terminal 10 can also be a telecommunications device, such as but not limited to: a PDA; a cell phone; a pager; etc., as any device that has a display coupled to the casing of the device.

The portal terminal 10 has a number of components including a user interface (e.g. a keyboard 28) located on a front surface 20, one or more onboard processors 50 (e.g. shown by ghosted lines as inside of the casing 26), and a communications module 52 (e.g. laser, WLAN, Bluetooth, imager, RFID scanner, etc.—inside of the casing 26), for example located on a back surface 40 of the terminal 10, for facilitating wireless communication. The portable terminal 10 also has an onboard power source 54 located on the back surface 40 for helping to satisfy power requirements of the onboard processor(s) 50, the user interface, and optionally the communication module 52. Further, the casing 26 has a proximal end 32, a distal end 34, and a first side 36 and a second side 38 extending between the ends 32, 34.

The power source 54 (e.g. battery) is contained within the casing 26 by a cover 42 that is coupled to the casing 26 on the back surface 40, as either removable or as an integral part of the casing 26. Further, the portable terminal 10 may have an optional handle 44, connected via a release securable connection, to a casing 26 of the portable terminal 10. It is also recognised that the handle 44 may be permanently or otherwise fixedly attached to the casing 26 by fastening means such as but not limited to: protrusions engaged in slots, latch mechanisms, fasteners (e.g. screws), adhesives or other bonding agents, etc. Further, the handle 44 may be an integral component of at least a portion of the casing 26 (e.g. molded as part of the casing 26).

Figure 4:
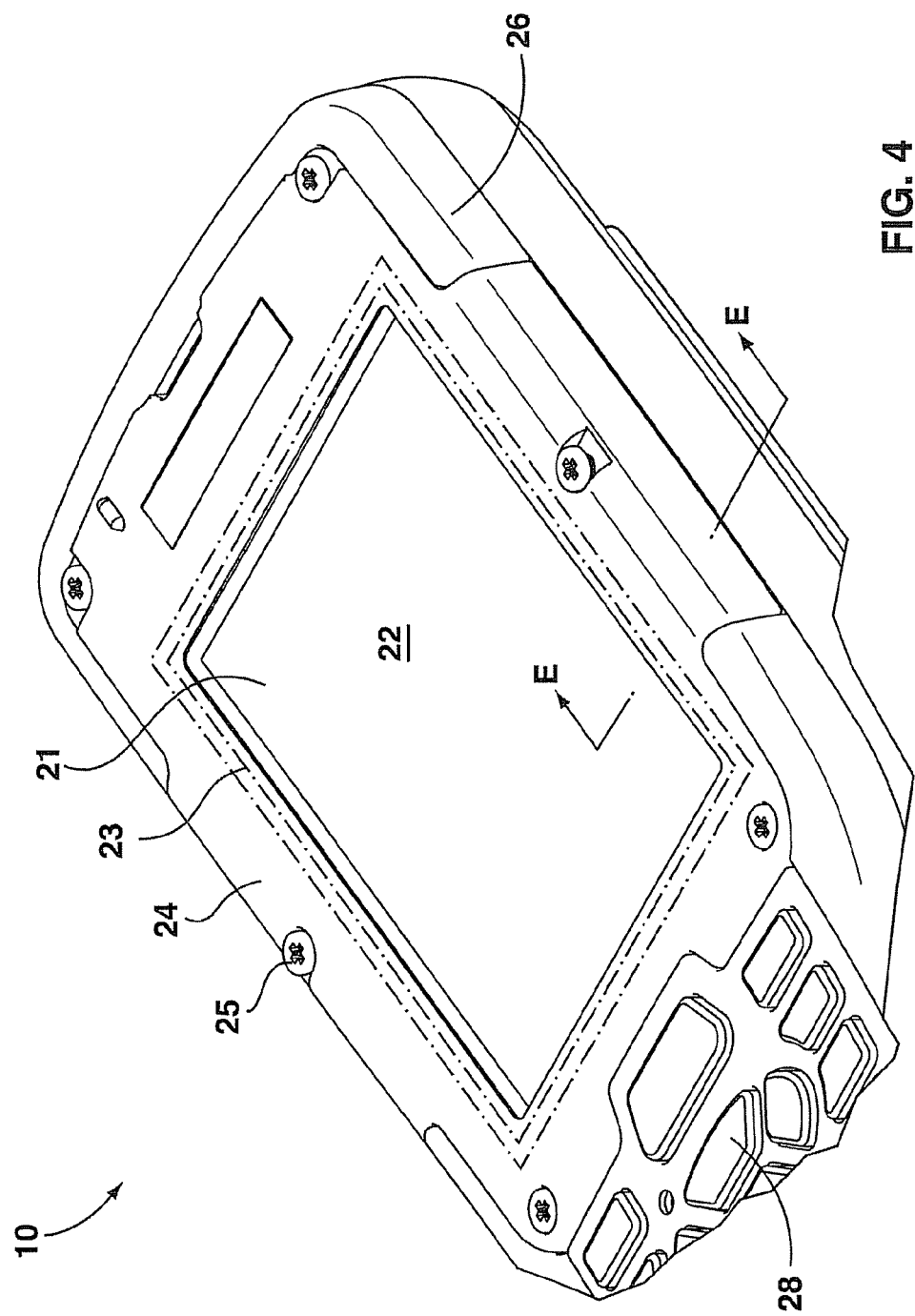
FIG. 4 shows a perspective top view of a display assembly of a portable module of FIG. 2.

Referring to FIG. 4, a perspective view of the display assembly 22 is shown. The display assembly 22 is modular in structure including a display (e.g. 106 and 214 in FIGS. 5 and 7) situated between a resilient body (e.g. 108 and 218 in FIGS. 5 and 7) and the housing (e.g. 110 and 220 in FIGS. 5 and 7). A sealing gasket (e.g. 104 and 204 in FIGS. 5 and 7) is placed on the top surface of the display and when the cover plate (e.g. 24, 102 and 202 in FIGS. 4, 5 and 7) is placed over the housing, a seal is created such that the ingress of foreign matter (e.g. water, moisture, particulate matter, etc.) around the display and into the interior compartment (e.g. 112 and 222 in FIGS. 5 and 7) is inhibited. Further, the display may include a touchscreen (e.g. 206 in FIG. 7) with a touchscreen layer on top of the display to facilitate user interaction, in addition to the keyboard 28. The touchscreen layer may be formed from any suitable materials such as Indium Tin Oxide (ITO). The cover plate 24 is configured for having an aperture 21 for accommodating interaction (e.g. touch screen functionality) between the user of the portable terminal 10 and the top surface of the display 22. In an embodiment of the present invention, the cover plate 24 may include channel 23 to accommodate sealing gasket (e.g. 104 and 204 of FIGS. 5 and 7).

Display Assembly

Figure 5:
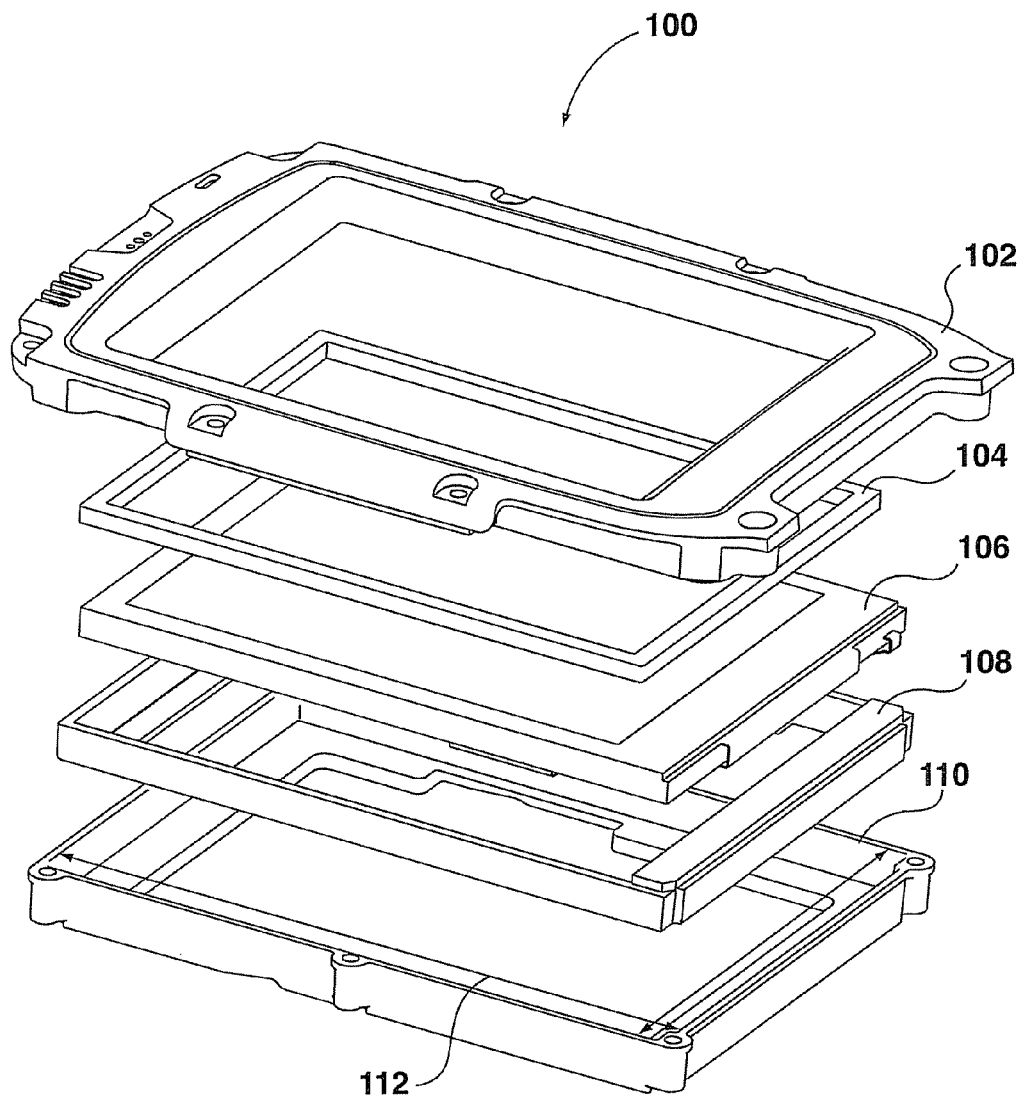
FIG. 5 shows an exploded view of the display assembly according to an embodiment of the invention.

Referring to FIG. 5, an exploded view of the display assembly 100 is shown. In this embodiment, the display assembly 100 includes a cover plate 102, a sealing gasket 104, a display 106 (this display incorporates a touchscreen on top of the display 106), a resilient body 108, and a housing 110. The housing 110 defines an interior compartment 112 where the display 106 and the resilient body 108 are positioned. The display assembly 100 may also include a display transition board 114 (FIG. 6) and a plane grounding spring (not shown).

Figure 6:
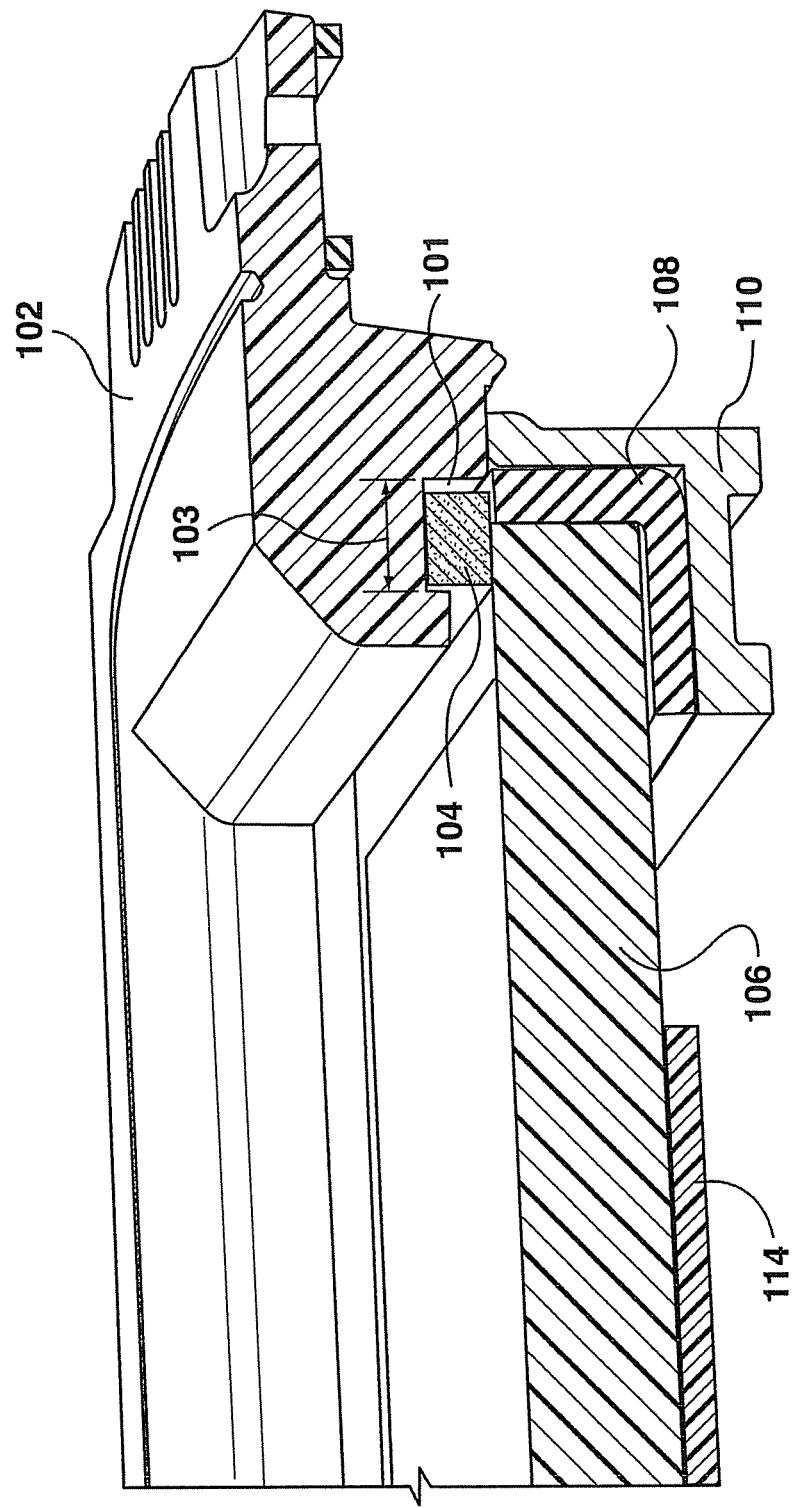
FIG. 6 shows a cross-sectional view of the display assembly of FIG. 5, taken along line E-E of FIG. 4.

Now referring to FIG. 6, a cross-section of the display assembly 100 along line E-E (see FIG. 4) of the embodiment shown in FIG. 5 is shown. As it can be seen, the resilient body 108 has a base portion and a continuous side portion extending from the base portion. These portions engage the side and bottom surface of the display 106 to frictionally hold the display 106. Moreover, the resilient body 108 acts as a shock-absorbing layer to the display 106 against the housing 110. In another embodiment of the invention, the resilient body 108 may include a ledge portion extending from the top portion of the continuous side portions (i.e. on an end opposite to the base portion) to protect the integrated circuits in the display. This can best be seen in FIG. 5 where resilient body 108 includes a ledge portion on the top section of the body 108.

The display 106 and the resilient body 108 are then placed in the interior compartment 112 (shown in FIG. 5) of housing 110. Once the display 106 and the resilient body 108 are placed in the interior compartment 112 of housing 110, the sealing gasket 104 can be placed on the display 106. In this particular embodiment, the sealing gasket 104 is made of sealing foam and the resilient body 108 is made of silicon rubber.

Advantageously, the material of the sealing gasket 104 may be different from the material of the resilient body 108. This allows a material more suitable for sealing to be chosen for the sealing gasket 104 (e.g. sealing foam) and a more efficient shock-absorbing material to be chosen for the resilient body 108. Moreover, because they are two separate pieces, manufacturing is rendered easier. For the resilient body 108, compression molding may be used to create a more precise body that receives the components of the display assembly better.

Once the sealing gasket 104 is in place, the cover plate 102 is placed over the sealing gasket 104 and fastened to the housing 110, creating a seal to prevent foreign material from entering the interior compartment 112 of the housing 110. As depicted in FIG. 6, the cover plate 102 includes an expansion gap 101 that accommodates the expansion of sealing gasket 104 laterally into the cover plate 102.

In an another embodiment of the present invention, a channel 103 may be provided in the cover plate 102 to better accommodate the sealing gasket 104. The channel 103 is shaped and sized to accommodate the sealing gasket 104 when the cover plate 102 is placed over the sealing gasket 104 and fastened to the housing 110. The channel 103 allows for better fitment of the sealing gasket 104, thereby providing a better seal.

Figure 7:
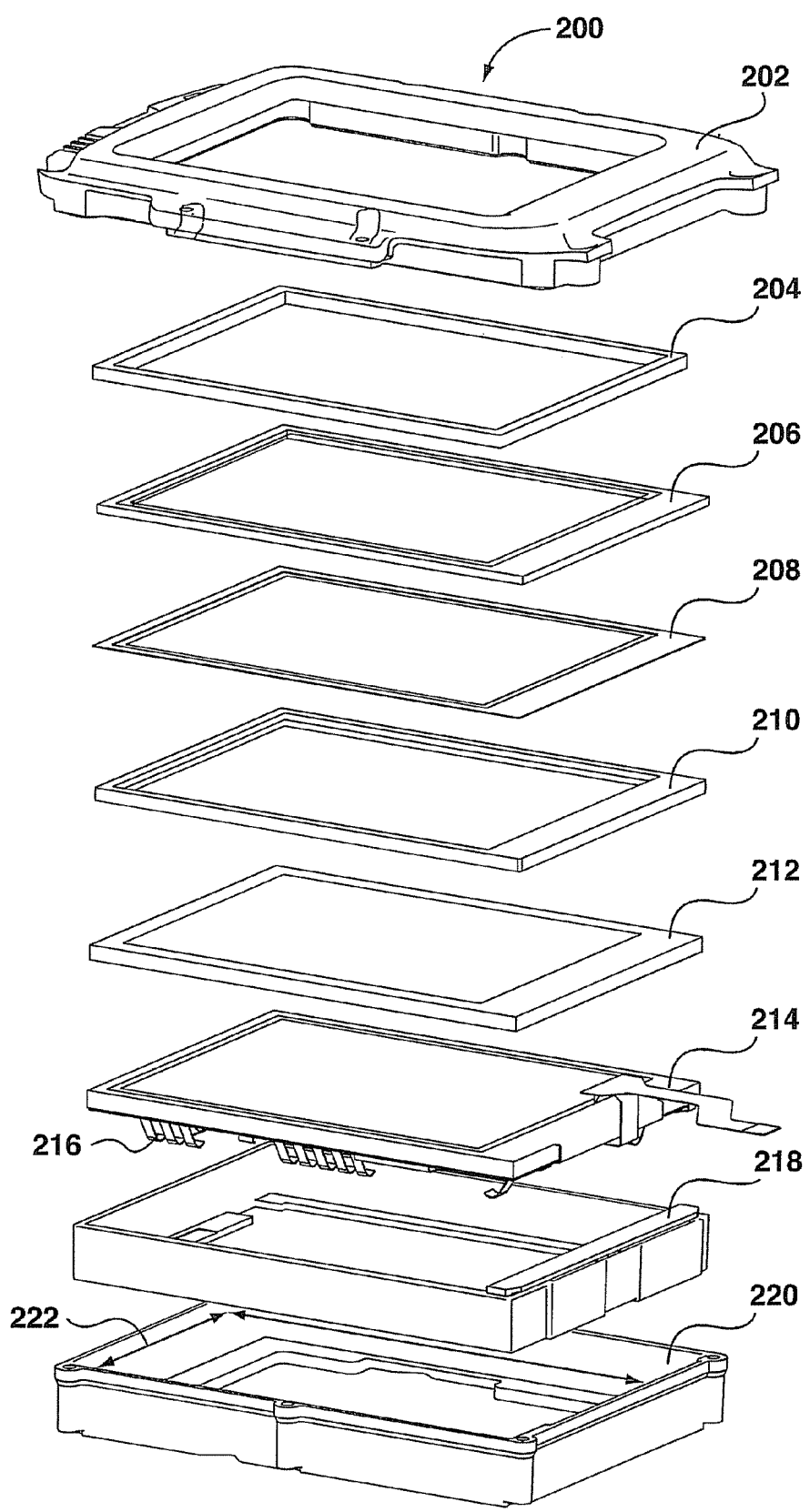
FIG. 7 shows an exploded view of the display assembly according to an another embodiment of the present invention.

Referring to FIG. 7, an exploded view of another embodiment of the present invention is shown. As shown, the display assembly 200 includes a cover plate 202, a sealing gasket 204, a touchscreen 206, an adhesive layer 208, a metal spacer 210, a foam spacer 212, a display 214, a resilient body 218 and a housing 220. Unlike the embodiment shown in FIG. 5, the display 214 does not incorporate a touchscreen directly on the top surface of the display; instead, a touchscreen 206 is provided, which is separated from the display 214 by the metal spacer 210 and foam spacer 212. The touchscreen 206 is adhered to the metal spacer 210 by the adhesive layer 208. Further, the touchscreen 206 includes a touchscreen layer formed from any suitable material such as Indium Tin Oxide (ITO). The housing 220 defines an interior compartment 222 where the display 214, the touchscreen 206 and the resilient body 218 are located. The display system 200 may also include a display transition board (224 in FIG. 8) and a plane grounding spring 216.

Figure 8:
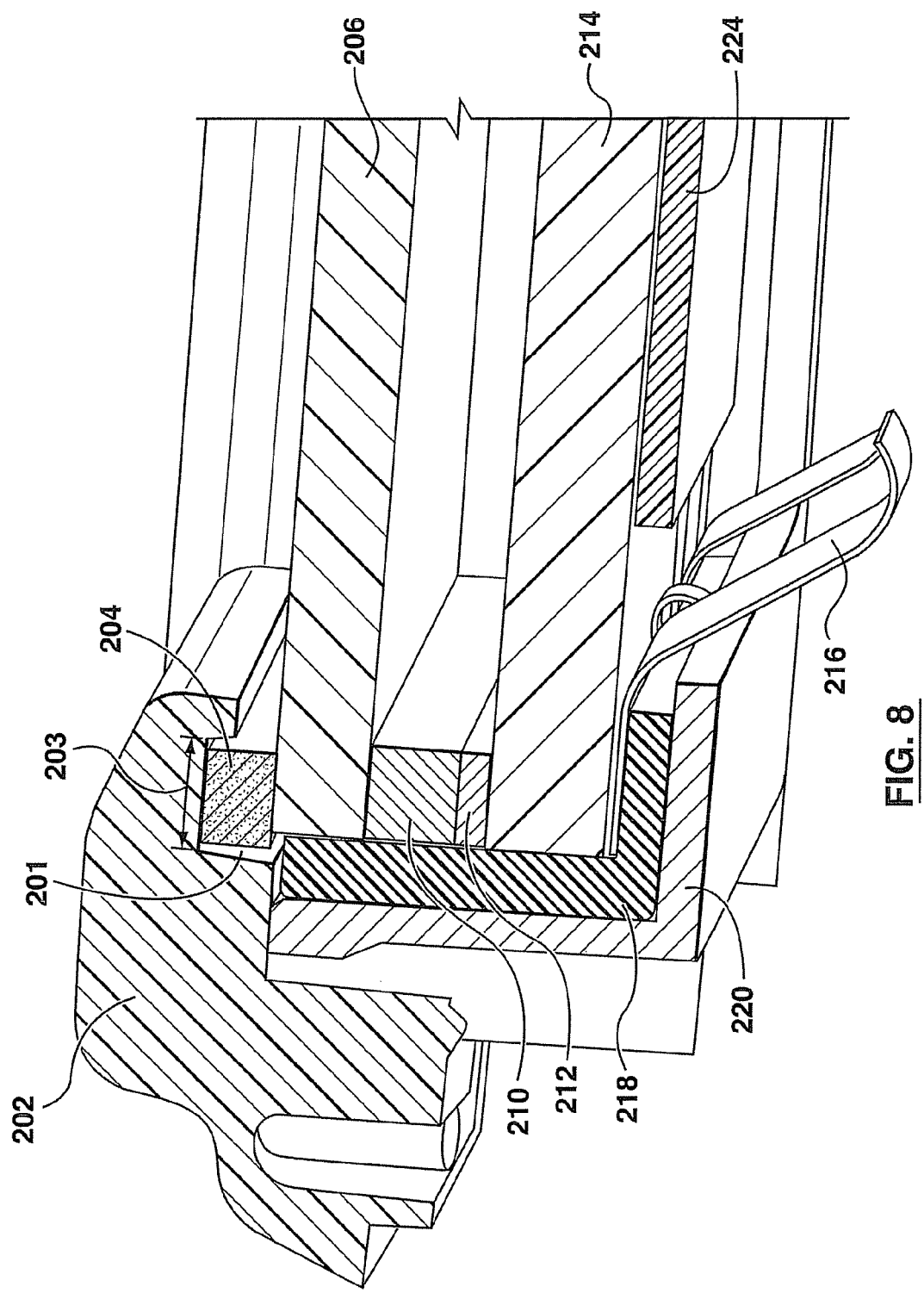
FIG. 8 shows a cross-section view of the display assembly of FIG. 7, taken along line E-E of FIG. 4.

Now referring to FIG. 8, a cross-section of the display assembly 200 along line E-E (see FIG. 4) of the embodiment shown in FIG. 7 is shown. As it can be seen, the resilient body 218 has a base portion and a continuous side portion extending from the base portion. These portions engage the sides of the touchscreen 206, metal spacer 210, foam spacer 212 and the display 214 (for the display 214, the base portion of the resilient body 218 also engages the bottom surface of the display 214) to hold them inside the interior component 222 (see FIG. 7) of the housing 220. The resilient body 218 provides a shock-absorbing layer to the display 214 and the touchscreen 206 against the housing 220. In another embodiment of the invention, the resilient body 218 may include a ledge portion extending from the top portion of the continuous side portions (i.e. on an end opposite to the base portion) to protect the integrated circuits in the display. This can best be seen in FIG. 7 where resilient body 218 includes a ledge portion on the top section of the body 218.

Once the components and the resilient body 218 are placed in the interior compartment 222 of the housing 220, the sealing gasket 204 can be placed over these components. The material of the sealing gasket may be a material that is different from the resilient body 218 and one that can compress and expand more easily. In this particular embodiment, the sealing gasket 204 is a sealing foam and the resilient body 218 is a silicon rubber. However, other types of material can be used as the sealing gasket and as the resilient body. Thereafter, the cover plate 202 is placed over the sealing gasket 204 and fastened to the housing 220, creating a seal to prevent foreign material from entering the interior compartment 222 of the housing 220. As depicted in FIG. 8, the cover plate 202 includes an expansion gap 201 that accommodates the expansion of sealing gasket 204 laterally into the cover plate 202. This expansion gap 201 allows the sealing gasket 204 to expand outwardly rather than inwardly into the centre of the touchscreen 206. In effect, the "pillowing" effect discussed above is reduced.

The channel 203 may be provided in the cover plate 202 to better accommodate the sealing gasket 204. The channel 203 is shaped and sized to accommodate the sealing gasket 204 when the cover plate 202 is placed over the sealing gasket 204 and fastened to the housing 220.

Figure 9:
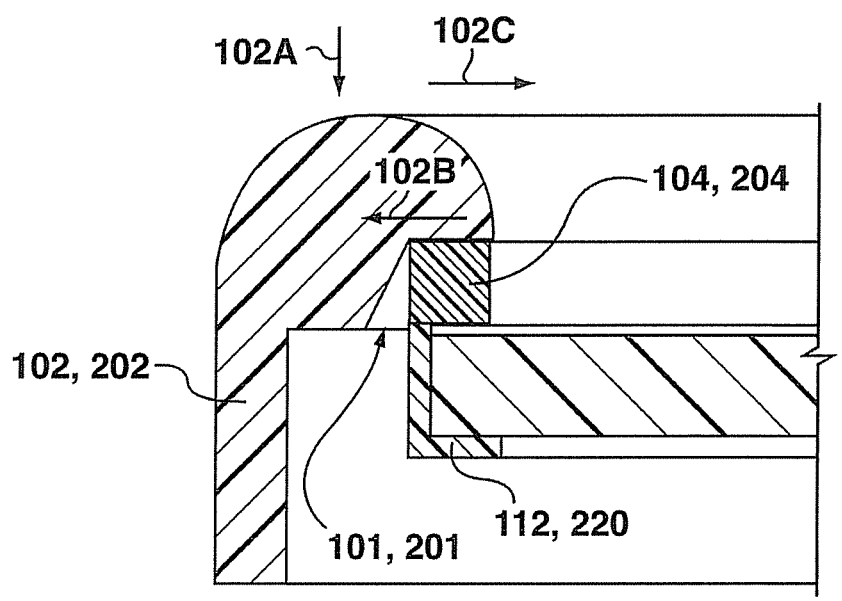
FIG. 9 shows a cross-sectional view of the display assembly of FIGS. 5 and 7, taken along line E-E of FIG. 4, showing the workings of the components when assembled.

Once assembled, the embodiments of the present invention create a seal to prevent foreign material from penetrating the interior compartment 112, 222 of the housing 110, 220. This is achieved by the sealing gasket 104, 204 sealably engaging the top surface of the display 106, 214. This top surface may be a touchscreen 206 as shown in FIGS. 7 and 8. In other embodiments, the top surface may be other types of film layers or coatings. Unlike the resilient body 108, 218, which is made of resilient material (e.g. silicon rubber), the sealing gasket 104, 204 is typically a material that is able to expand and compress much more easily. For example, a sealing foam can be compressed and expanded depending on the types of forces exerted. As depicted in FIG. 9, as pressure is exerted downwardly from the cover plate 102, 202 (i.e. force 102A), the sealing gasket 104, 204 is able to expand into (102B as shown in FIG. 9) the expansion gap 101, 201 in the cover plate 102, 202. This expansion gap 101, 201 allows the sealing foam 104, 204 to expand in the direction 102B, rather than just in the direction 102C, reducing the "pillowing" effect. As described above, the inward forces exerted on the top surface of the display 106, 214 (i.e. 206 in FIGS. 7 and 8) forces the top surface of the display (which may be a film, coating or a touchscreen as in 206 of FIGS. 7 and 8 having a touchscreen layer) to separate from the display and rise, creating a "pillowing" of the display. By providing an expansion gap 101, 201, the exerted force (i.e. 102A) causes the sealing gasket 104, 204 to expand into the cover plate 102, 202 and away from the centre of the display 106, 214. Thus, the top surface is "pulled" from rather than "pushed" into the centre of the display 106, 214.

Advantageously, since the sealing gasket 104, 204 is able to move independently from the resilient body 108, 218, the amount of lateral force exerted on the top surface of the display 106, 214 is reduced.

One or more currently preferred embodiments have been described by way of example. It will be apparent to persons skilled in the art that a number of variations and modifications can be made without departing from the scope of the invention as defined in the claims.

What is claimed is:

1. A display assembly for a portable module, the display assembly comprising:
    a housing comprising a base portion and a continuous side portion extending from the base portion to define an interior compartment;
    a resilient body positioned in the interior compartment of the housing, the resilient body comprising a base portion and a continuous side portion extending from the base portion;
    a display having side and bottom surfaces engaged by the resilient body;
    a cover plate for enclosing the housing, the cover plate having an expansion gap; and
    a sealing gasket positioned between only a top surface of the display and the cover plate, the sealing gasket overlapping a portion of the top surface of the display, the sealing gasket being a separate piece from the resilient body;
    wherein when the cover plate is coupled to the housing, the sealing gasket creates a tight seal between the display and the sealing gasket to inhibit the penetration of foreign matter into the interior compartment of the housing and the expansion gap in the cover plate accommodates the expansion of the sealing gasket.

2. A display assembly according to claim 1, wherein the sealing gasket is formed from a sealing foam.

3. A display assembly according to claim 2, the cover plate further comprising a channel to accommodate the sealing foam, the channel having dimensions sufficient to encapsulate the sealing foam.

4. A display assembly according to claim 1, further comprising a touchscreen having a touchscreen layer positioned between the display and the sealing gasket.

5. A display assembly according to claim 4, wherein the touchscreen is adhered to the top surface of the display by an adhesive layer.

6. A display assembly according to claim 4, wherein the touchscreen and the display are separated by a metal spacer and a foam spacer, the touchscreen adhered to the metal spacer by an adhesive layer.

7. A display assembly according to claim 4, wherein the touchscreen layer is an indium tin oxide (ITO) layer.

8. A display assembly according to claim 1, the resilient body further comprising a ledge portion extending from the continuous side portion, the ledge portion for protecting an integrated circuit portion of the display.

9. A display assembly according to claim 1, further comprising a display transition board coupled to the display.

10. A display assembly according to claim 1, further comprising a plane grounding spring coupled to the display.

11. A display assembly according to claim 1, wherein the resilient body is formed from silicon rubber.

12. A display assembly according to claim 1, wherein the resilient body is compression molded.

13. A display assembly according to claim 4, wherein the resilient body does not engage the touchscreen.

* * * * *